United States Patent
Anderson et al.

(10) Patent No.: US 9,344,482 B2
(45) Date of Patent: May 17, 2016

(54) LOCAL AGENT FOR REMOTE FILE ACCESS SYSTEM

(75) Inventors: Jeffrey G. Anderson, San Diego, CA (US); Daniel G. Hoffman, Los Gatos, CA (US); Amy N. Hoffman, Los Gatos, CA (US)

(73) Assignee: Benhov GmbH, LLC, Wilmington, DE (US)

( * ) Notice: Subject to any disclaimer, the term of this patent is extended or adjusted under 35 U.S.C. 154(b) by 1277 days.

(21) Appl. No.: 11/506,383

(22) Filed: Aug. 18, 2006

(65) Prior Publication Data

US 2006/0282521 A1     Dec. 14, 2006

Related U.S. Application Data

(62) Division of application No. 10/053,402, filed on Jan. 17, 2002.

(60) Provisional application No. 60/340,052, filed on Nov. 1, 2001.

(51) Int. Cl.
*G06F 15/16*   (2006.01)
*H04L 29/08*   (2006.01)

(52) U.S. Cl.
CPC ........... *H04L 67/06* (2013.01); *H04L 67/10* (2013.01); *H04L 67/28* (2013.01); *H04L 67/306* (2013.01); *H04L 67/325* (2013.01); *H04L 69/329* (2013.01); *H04L 67/2895* (2013.01)

(58) Field of Classification Search
USPC .......................................... 709/217, 218, 219
See application file for complete search history.

(56) References Cited

U.S. PATENT DOCUMENTS

| 5,771,273 | A |   | 6/1998  | McAllister et al. |
|-----------|---|---|---------|-------------------|
| 5,845,282 | A | * | 12/1998 | Alley et al.      |
| 5,946,630 | A |   | 8/1999  | Willars et al. ............. 455/466 |
| 5,951,640 | A |   | 9/1999  | Laura ......................... 709/217 |
| 5,966,652 | A |   | 10/1999 | Coad et al. ................. 455/412 |
| 6,023,708 | A |   | 2/2000  | Mendez et al. ............ 707/203 |
| 6,067,297 | A | * | 5/2000  | Beach ......................... 370/389 |

(Continued)

FOREIGN PATENT DOCUMENTS

WO     WO 98/49625 A1     11/1998
WO     WO 99/05620 A1      2/1999

(Continued)

OTHER PUBLICATIONS

Microsoft Press Computer Dictionary, 1997, Microsoft Press, Third Edition, 392-462.

(Continued)

*Primary Examiner* — Karen Tang
(74) *Attorney, Agent, or Firm* — Meyertons, Hood, Kivlin, Kowert & Goetzel, P.C.

(57) ABSTRACT

Systems and methods for remote file access are disclosed. According to an embodiment, a local agent polls a server for a task request at a polling interval scheduled by a schedule timer in accordance with a set of local agent and remote client preferences. The local agent is responsible for executing a task from the task request and causing a file to be uploaded to the server. The local agent uses a task processor for polling a server, a schedule timer for controlling polling, and one or more protocol stacks, such as TCP/IP and SOAP, for communicating with the server. The local agent can also interface with a MAPI database for message delivery.

21 Claims, 6 Drawing Sheets

(56) References Cited

U.S. PATENT DOCUMENTS

| | | | |
|---|---|---|---|
| 6,088,337 A * | 7/2000 | Eastmond et al. | 370/280 |
| 6,088,721 A * | 7/2000 | Lin et al. | 709/214 |
| 6,104,924 A | 8/2000 | Shirai | 455/418 |
| 6,108,711 A | 8/2000 | Becjk et al. | 709/242 |
| 6,131,096 A * | 10/2000 | Ng et al. | |
| 6,131,116 A * | 10/2000 | Riggins et al. | 709/219 |
| 6,134,432 A | 10/2000 | Holmes et al. | 455/412 |
| 6,141,550 A | 10/2000 | Ayabe et al. | 455/433 |
| 6,148,197 A | 11/2000 | Bridges et al. | 455/432 |
| 6,151,606 A | 11/2000 | Mendez | 707/201 |
| 6,208,870 B1 | 3/2001 | Lorello et al. | 455/466 |
| 6,233,341 B1 | 5/2001 | Riggins | 380/277 |
| 6,240,296 B1 | 5/2001 | Yu et al. | 455/466 |
| 6,263,363 B1 | 7/2001 | Rosenblatt et al. | 709/217 |
| 6,292,181 B1 * | 9/2001 | Banerjee et al. | 345/179 |
| 6,304,881 B1 | 10/2001 | Halim et al. | 707/201 |
| 6,341,316 B1 | 1/2002 | Kloba et al. | 709/248 |
| 6,351,747 B1 | 2/2002 | Urazov et al. | 707/10 |
| 6,381,636 B1 * | 4/2002 | Cromer et al. | 709/211 |
| 6,505,200 B1 | 1/2003 | Ims et al. | 707/8 |
| 6,539,422 B1 | 3/2003 | Hunt et al. | 709/217 |
| 6,615,253 B1 | 9/2003 | Bowman-Amuah | 709/219 |
| 6,640,249 B1 | 10/2003 | Bowman-Amuah | 709/228 |
| 6,658,464 B2 | 12/2003 | Reisman | 709/219 |
| 6,675,205 B2 | 1/2004 | Meadway | 709/219 |
| 6,711,611 B2 | 3/2004 | Hanhan | |
| 6,735,601 B1 | 5/2004 | Subrahmanyam | 707/200 |
| 6,757,696 B2 | 6/2004 | Multer et al. | 707/201 |
| 6,757,734 B1 | 6/2004 | Resenius et al. | |
| 6,760,760 B1 | 7/2004 | McGrane | 709/219 |
| 6,779,019 B1 | 8/2004 | Mousseau et al. | 709/206 |
| 6,922,725 B2 | 7/2005 | Lamming et al. | |
| 6,934,756 B2 | 8/2005 | Maes | |
| 6,981,041 B2 * | 12/2005 | Araujo et al. | 709/224 |
| 7,016,847 B1 | 3/2006 | Tessel et al. | 704/275 |
| 7,028,252 B1 * | 4/2006 | Baru et al. | 715/273 |
| 7,072,975 B2 | 7/2006 | Kato | |
| 7,195,157 B2 * | 3/2007 | Swartz et al. | 235/383 |
| 7,203,725 B1 | 4/2007 | Gilmour et al. | 709/206 |
| 7,274,783 B2 | 9/2007 | Yoakum et al. | |
| 7,305,381 B1 * | 12/2007 | Poppink et al. | 707/3 |
| 7,328,245 B1 * | 2/2008 | Hull et al. | 709/206 |
| 7,386,588 B2 * | 6/2008 | Mousseau et al. | 709/205 |
| 7,433,702 B2 | 10/2008 | Lindskog et al. | |
| 7,499,979 B2 | 3/2009 | Hess et al. | |
| 2001/0023448 A1 * | 9/2001 | Hanhan | 709/231 |
| 2001/0031626 A1 * | 10/2001 | Lindskog et al. | 455/67.3 |
| 2001/0047393 A1 | 11/2001 | Arner et al. | 709/216 |
| 2001/0047397 A1 * | 11/2001 | Jameson | 709/217 |
| 2002/0023140 A1 * | 2/2002 | Hile et al. | 709/217 |
| 2002/0132603 A1 * | 9/2002 | Lindskog et al. | 455/343 |
| 2002/0157113 A1 | 10/2002 | Allegrezza | |
| 2002/0161826 A1 | 10/2002 | Arteaga et al. | 709/203 |
| 2002/0184373 A1 * | 12/2002 | Maes | 709/228 |
| 2002/0184385 A1 | 12/2002 | Kato | 709/237 |
| 2002/0191587 A1 | 12/2002 | Wong et al. | 370/352 |
| 2002/0194183 A1 | 12/2002 | Yoakum et al. | 707/10 |
| 2002/0194307 A1 * | 12/2002 | Anderson et al. | 709/219 |
| 2003/0055909 A1 | 3/2003 | Hartwig et al. | 709/208 |
| 2003/0069921 A1 * | 4/2003 | Lamming et al. | 709/203 |
| 2003/0084128 A1 | 5/2003 | Anderson et al. | 709/220 |
| 2003/0158928 A1 | 8/2003 | Knox et al. | 709/223 |
| 2005/0004992 A1 * | 1/2005 | Horstmann et al. | 709/206 |
| 2005/0120082 A1 * | 6/2005 | Hesselink et al. | 709/203 |
| 2005/0138432 A1 * | 6/2005 | Ransom et al. | 713/201 |
| 2005/0283462 A1 | 12/2005 | Pennec et al. | |
| 2006/0101131 A1 * | 5/2006 | Hess et al. | 709/219 |
| 2007/0073845 A1 * | 3/2007 | Reisman | 709/219 |
| 2007/0100585 A1 * | 5/2007 | Dulberg et al. | 702/184 |
| 2007/0174428 A1 * | 7/2007 | Lev Ran et al. | 709/218 |
| 2007/0174442 A1 * | 7/2007 | Sherman et al. | 709/223 |
| 2007/0220107 A1 * | 9/2007 | Reisman | 709/217 |
| 2007/0239609 A1 * | 10/2007 | Fish et al. | 705/51 |
| 2007/0263007 A1 * | 11/2007 | Robotham et al. | 345/581 |
| 2008/0089302 A1 * | 4/2008 | Godfrey et al. | 370/338 |
| 2008/0155152 A1 | 6/2008 | Keeney et al. | |
| 2009/0164781 A1 * | 6/2009 | Bouchard | 713/165 |
| 2009/0205026 A1 * | 8/2009 | Haff et al. | 726/5 |

FOREIGN PATENT DOCUMENTS

| | | |
|---|---|---|
| WO | WO 99/05813 A2 | 2/1999 |
| WO | WO 99/06900 A2 | 2/1999 |
| WO | WO 00/11567 A1 | 3/2000 |
| WO | WO 00/11832 A1 | 3/2000 |
| WO | WO 01/35772 A1 | 2/2001 |
| WO | WO 01/59998 A2 | 8/2001 |
| WO | WO 01/15399 A2 | 9/2001 |

OTHER PUBLICATIONS

2001 Experticity, Inc., *Go to my PC: A Secure Remote-Access Solution*, (Visited Jan. 25, 2002) http://www.gotomypc.com.

* cited by examiner

LOCAL AGENT FOR REMOTE FILE ACCESS SYSTEM

CROSS-REFERENCE TO RELATED APPLICATIONS

This application is a divisional application under 35 U.S.C. §121 of U.S. application Ser. No. 10/053,402, filed Jan. 17, 2002 entitled LOCAL AGENT FOR REMOTE FILE ACCESS SYSTEM. This application claims the benefit under 35 U.S.C. §119 of U.S. Provisional Application Ser. No. 60/340052, filed Nov. 1, 2001, entitled SYSTEMS AND METHODS FOR REMOTE FILE ACCESS, which is incorporated herein by reference as if included in its entirety.

BACKGROUND

1. Field of the Invention

The invention pertains to computer resource management and access systems, and in particular remote access to files stored in different locations.

2. Background Information

An individual's home or work computer is typically used a central repository for information. Often, however, individuals do not work at the same physical site, or much less with their repository computer at their fingertips. Rather, an individual will work at one or more locations remote from their home or work computer, and, the computer being the central repository for information, the user will need files or information stored in their repository computer.

There are a number of known solutions to this problem. The most common solution is the use of large file servers residing on private networks, and some sort of network management software, such at Windows NT™. In such a system, the individual's files are stored in a large shared disk system so that while working in a local site, a user can logon and store and retrieve information on the shared disk, usually from a desktop computer at a remote site. While on the road, the individual may use a laptop computer that includes a wireless, PSTN, or LAN/WAN communications card, such as a PCM-CIA card, to "dial up" and connect to the network and retrieve and store files.

Known software systems that are commercially available to this end include the Windows NT operating system and the Terminal Services Client, both by Microsoft Corp. in Redmond, Wash. Another solution is PCAnywhere™ software, available from Symantec Corp. in Cupertino, Calif. Both of these systems involve maintenance of a real-time connection between the client device (needing access to the files) and the server device (which is communicatively coupled to the files). U.S. Pat. No. 6,131,096, by Mason Ng et al. (which requires a special downloadable personal information manager executable), and U.S. Pat. No. 6,131,116, by Mark D. Riggins et al. (which requires special applet information before communications can be setup), both issued to Visto Corporation shows an equivalent system. Basically, these systems concern emulation of a desktop environment.

Other solutions we are aware of include WIPO publication WO01/59998, by Ash Gupte et al., for Etrieve, Inc. This reference discloses a method and system for wireless receipt of electronic messages or "e-mail". In this system, e-mail messages are received by an e-mail server, where they are, as is usually done, stored with a unique record locator. After being saved, the e-mail server sends a notification signal to a wireless device, with the unique record locator, so that a user of the wireless device can initiate a "one-click" return a signal indicating that the user wishes to receive the e-mail at the wireless device from the e-mail server.

WIPO publication WO98/49625, by Jonathan R. Engelsma et al., for Motorola, Inc., discusses a system for accessing and transferring e-mail messages from a private computer to a multiple access wireless communication system. Particular to the Engelsma et al. system is an information delivery agent and an internet interface. The information delivery agent is controlled by a server. Here, information is retrieved via the information delivery agent, which communicates via hypertext transfer protocol, to an internet interface, and the internet interface, in turn, to the private computer. E-mail messages are converted to voice messages, and then the voice message is automatically relayed to a mobile device.

U.S. Pat. No. 6,108,711, by Christoper C. M. Beck, et al., issued to Genesys Telecommunications Laboratories, Inc., discusses a multi-media transaction processing system, designed to share files of various media types between various layers and multiple parties to a business transaction by recording and extracting information from transactions, querying records, and threading records together. The Beck et al. system appears to be targeted more toward managing interactions and work flow between parties than it is toward providing access to resources.

U.S. publication US2001/0023448, by Musa Hanhan, which says it is an improvement on the Beck et al. system, discusses a proxy system whereby a worker remote from a communication center operates a workstation at the communication center through a light client or computing device. The Hanhan system is quite similar to the Beck et al. system, but the Hanhan system is more focused on providing full and unfettered access to home-center data and services. To this end, Hanhan suggests that the proxy server establish and maintain a constant, real-time connection to a server or workstation at the home-center over a two-way data link, so that software and data can be operated and accessed, then transformed and sent to the light client.

SUMMARY OF THE INVENTIONS

We have invented systems and methods for remote file access. These systems and methods include a remote file access protocol, a local agent architecture and methods, and remote client methods. Aspects of our systems and methods are embodied in computer software. Features of each of the systems and methods are set forth below in the claims.

According to an embodiment, the remote file access systems and methods are embodied in local agent software including a plurality of software modules, the software comprising a transmission control protocol/internet protocol stack for network communication with a server over a network; an extensible markup language input/output parser, communicatively coupled to the transmission control/internet protocol stack, for breaking down data and commands; a simple object access protocol interpreter, communicatively coupled to the extensible markup language input/output parser, for creating file system instructions to poll the server for a task request and retrieve a file specified in the task request; and a task processor, communicatively coupled to the simple object access protocol interpreter, for executing subsystem instructions and initiating poll commands, based on a schedule timer. In one embodiment, the local agent module can further include a communications module configured to provide a carrier for network communication to the server, the local agent module configured to periodically connect to the server through the communication module at intervals set by the schedule timer.

In still another embodiment, the local agent module can comprise a message application programming interface, communicatively coupled to the task processor, for allowing access to a message application protocol interface database.

According to another embodiment, the remote file access systems and methods are embodied in a computer implemented method for a local agent comprising the acts of: polling a server for a task request; receiving a task request from the server; executing a task from the task request; uploading a file, identified in the task request, to a server; waiting for a schedule timer to expire; and repeating the above acts, beginning with the act of polling.

According to one embodiment, the local agent act of executing the task can include initiating a request to a subsystem for the file; and receiving the file from the subsystem. In another embodiment, the local agent act of executing the task includes: initiating a request to a subsystem for the file; instructing the subsystem to upload the file to the server; and receiving an indication that the file was uploaded to the server. In yet another embodiment, the local agent act of executing the task includes: initiating a request to a message access protocol interface for the file from a message access protocol interface database; and receiving the file from the message access protocol database.

According to another embodiment, the remote file access systems and methods are embodied in a computer implemented method for a remote client, comprising: sending a task request to a server, the task request identifying a file; receiving a notification that the task request is complete; and sending an instruction, responsive to the notification, concerning how to transfer the file identified in the task request. According to one embodiment, the act of sending the instructing includes identifying another remote client to which the file is to be transferred. According to another embodiment, the method further comprises: polling the server for indication that the task request is complete; wherein receiving the act of receiving the notification is responsive to the notification.

DETAILED DESCRIPTION OF THE PREFERRED EMBODIMENTS

We have invented systems and methods for remote file access comprising a server, a remote client, and a local agent. These parts can be interconnected via a communications network. Files needed while away from a local desktop computer, on which the local agent typically resides, can be accessed by the remote client through a server, preferably by way of an asynchronous communication protocol.

A system architecture, a remote file access protocol, server methods, a database system, local agent architecture and methods, and remote client methods are disclosed to achieve this remote file access framework.

Figure 1:
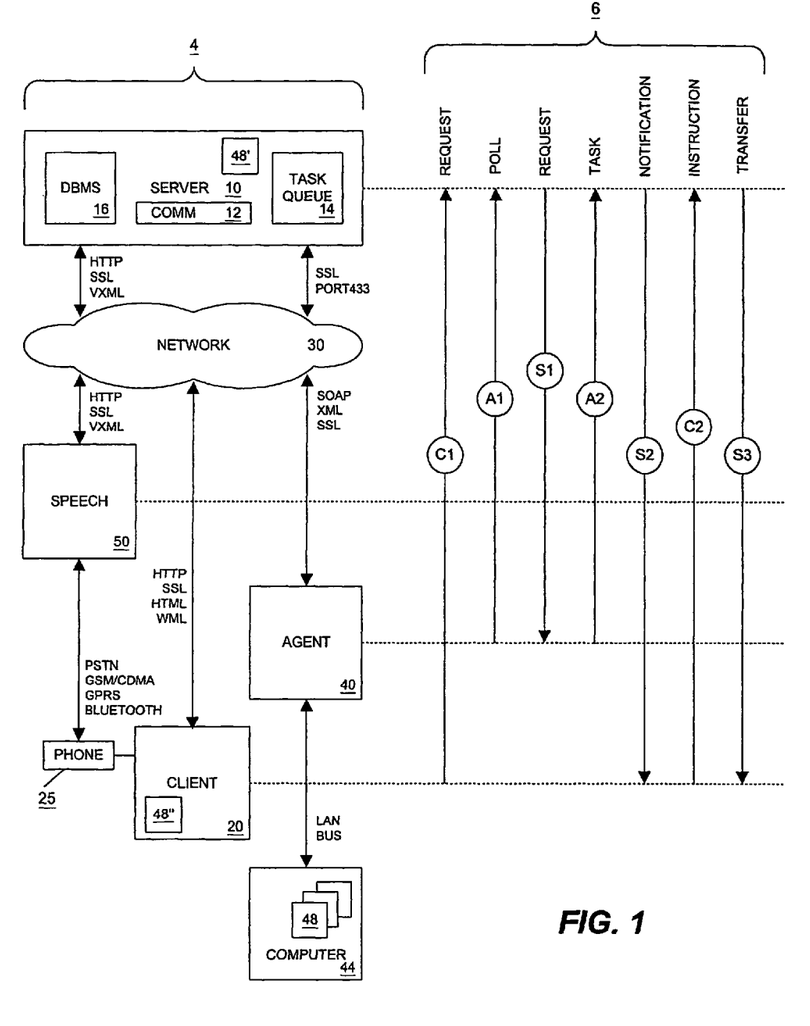
FIG. 1 is a system drawing and a protocol according to an embodiment.

FIG. 1 is a system drawing which shows a typical system configuration 4 and shows a communication protocol 6 according to embodiments of the inventions.

Turning first to the system configuration depicted under callout 4, we begin with a server 10. The server 10 is typically a web server and can run on a commercially available computer, such as a Sun Microsystems Enterprise Server™, available from Sun Microsystems in Mountain View, Calif., or a Dell™ or Gateway™ branded internet or application server. Such a system will include one or more microprocessors, a volatile memory area, a persistent memory area, and one or more mass storage devices. One or more sections of computer program code, or software, either in a compiled or an interpreted form, will run, for instance, in one of the memory areas, to cause the microprocessor(s) to perform the sequences of operations and techniques described below.

The server 10 should include a communications software stack 12, such as an IP (internet protocol) stack, and should be able to handle hypertext transfer protocol (HTTP) requests, secure socket layer (SSL) transactions, as well as a form of a standard generalized markup language (SGML), such as extensible markup language (XML), wireless markup language (WML), and optionally voice extensible markup language (VXML). Preferably, the variant of XML employed on the server is Microsoft's SOAP™ (Simple Object Access Protocol), although Java™ or X Windows™ could alternatively be employed. Hypertext markup language (HTML) files are preferably included on the server 10. The communications software stack 12 and the programming languages mentioned above are generally known in the art of network communications and interface design and are widely available.

The server 10 should further include a database management system 16, such as Microsoft Corporation's SQL Server 2000, or a version of Oracle Corporation's (in Redwood Shores, Calif.) flagship Oracle™ database, running over an operating system, such as Sun's Solaris™ or Microsoft's Windows NT™ operating system. Typically, these commercially available database systems will include connectivity software for allowing one or more clients/users logon privileges to the database, so that instructions to and from the server 10 can be answered and requested, with respect to clients/users that are logged onto the server 10.

A region of memory in the server 10 is reserved for a task queue 14. The task queue 14 is a special purpose memory structure for storing requests or tasks for a client/user that logs on to the server 10. These tasks and the operation of the task queue 14 will be described in further detail below. We note that the task queue 14 can be an addressable part of the database 16, or it can be a specially maintained region of memory in the server 10.

Files 48', from the computer 44 files 48, are shown temporarily stored at the server 10. This is described in further detail below, but we note that the files 48' can be stored in the database 16, a special memory region, such as the task queue 14, or another special memory region reserved for such files.

The server 10 is preferably configured to be communicatively coupled with a series of clients, comprising at least a remote client 20, and a local agent 40. Connectivity can be maintained or provided through a TCP/IP, wireless access protocol (WAP), HTTP, and/or an SSL protocol, as is depicted in the connectors between the various elements depicted in FIG. 1. Typically, the server 10 connections are maintained over a network 30, for instance a wide area network (WAN), such as the Internet. If a remote client 20 is to access the server 10 through another network, such as the public switched telephone network (PSTN), or a wireless device, then an appropriate protocol is used, and the server 10, or an intermediary device, handles the translation from the needed protocol and an IP protocol. In addition to connectivity features in the communications stack 12, communication can be made using SOAP, WML, XML or VXML, HTML programming languages.

Optionally, the server 10 can be configured to be coupled to a speech module 50, which is a text-to-speech and speech recognition system. Such a system preferably implements a VXML 2.0 or higher standard, such as one of the systems offered by BeVocal, Inc., in Sunnyvale, Calif. The speech module 50, can be hosted on a separate server platform, or it can be integrated into the server 10. What speech module 50 does is provide a voice or tone activated series of menus for communication from client 20 through the server 10, via a standard telephone or a wireless telephone 25.

While applying equally to telephone 25 and remote client 20, if communication is maintained via a wireless carrier, then any carrier can be used, such as the well known and widely deployed GSM or CDMA standard systems, as well as communications using the GPRS or Bluetooth standards. The speech module 50 is further configured to read text from computer files to a listener on the telephone 25. The files are drawn from a memory location at the server 10, and can be in a number of file formats, such as text, RTF, Word, WordPerfect, and HTML formats. The speech module 50 is configured to convert dial tone and speech from the phone 25 (remote client 20) into HTTP requests (such as POST or GET) to the server 10.

Turning to the remote client 20, it can be a portable digital assistant (PDA), such as products offered by Palm, Inc. in Santa Clara, Calif., or equivalent devices such as those offered by Compact Computer Corp., based in Houston, Tex., or the Blackberry™ two-way pager available from Research In Motion, based in Waterloo, Ontario. The remote client 20 can also be a standard laptop computer, or a standard desktop computer. Preferably, the client 20 includes a web interface means. The interface can be a standard web browser, or another type of interface that allows at least minimal connectivity between a client-server application implemented in a markup language, such as HTML, XML, WML, or another SGML variant.

The client 20 is shown in a standard embodiment as having files 48". These files are from server 10, copies from files 48', and from computer 44 files 48. If the speech module 50 is employed, however, then the client 20 does not need to have files 48", since the file 48' contents can be read to a user at a phone 25.

The local agent 40 is another software module that is resident on a local computer, or the "home computer", such as a personal desktop or work computer—where a user's files are typically located. The local agent 40 can also be resident on a local area network (LAN) to which the local computer, where the files are typically located, is connected, or a local file server, such as a database system or document management system, are connected. Basically, the local agent 40 must be able to achieve file access to the user's home or local files. We will describe the local agent 40 in terms of a local computer 44 for the purpose of illustration.

As mentioned above, files 48 on a local computer 44, are accessible by the local agent 40. The local computer 44 is typically a host system for the software module that is the local agent 40, so the local agent 40 is installed and executed on the local computer 44. If the local computer 44 is the host system for the local agent 40, then most of the communications and standard software stack that are used by the local agent 40 for connectivity and communication purposes can be found in the local computer 44. However, as is mentioned above, the local agent 40 can be connected to the files 48 by some other physical arrangement, such as over a local area network or bus without necessarily using a full purpose computer. In such a case, the local agent 40 can include connectivity or communication software modules, or the local agent 40 can draw upon resources of another device upon which it is installed.

Example of System Operation

Figure 2:
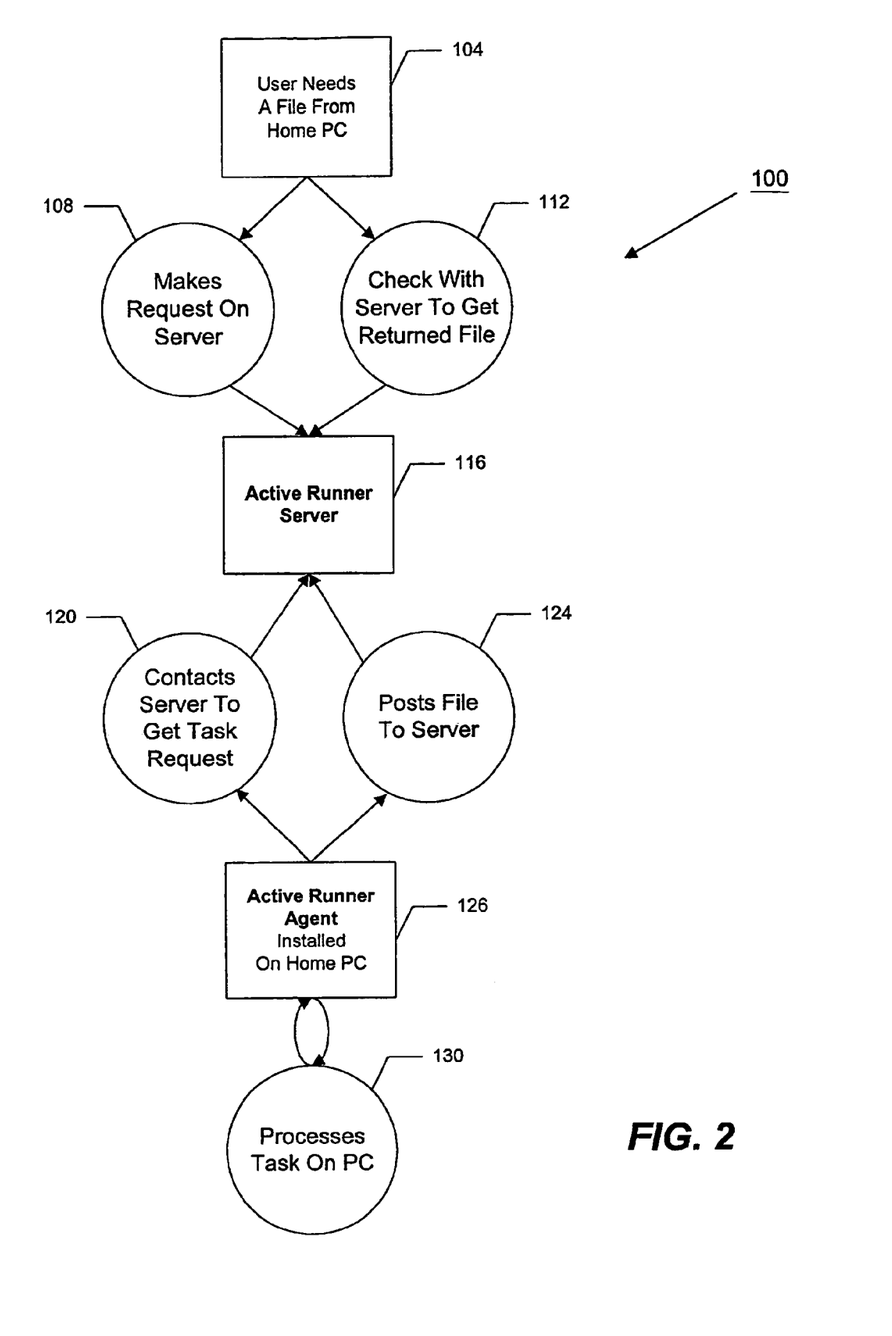
FIG. 2 shows a typical operational flow diagram.

Having described the system 4, we turn to FIG. 2 for an example of how the system 4 can be operated.

In a typical setup, we envision three primary pieces of physical hardware that comprise the system in this example. First, we have a remote client 20, which is a PDA, depicted as remote client 104. Second, we have a server 10, which is depicted and called out as ActiveRunner™ server 116. Third, we have a local agent 40, resident on a home computer 44, which is called out as ActiveRunner™ agent on local system 126.

A user of remote client 104 needs a file from her local system 126. At 12:03 PM, she sends a task request for a particular file at act 108 to the ActiveRunner™ sever 116. The ActiveRunner™ server 116 receives the task requests and places it in a task queue. (Previously, the user configured her ActiveRunner™ agent on her local system 126 to poll the ActiveRunner™ server 116 every 15 minutes, beginning at 12:00 AM.)

At 12:15 PM, the ActiveRunner™ agent on the user's local system 126, contacts the ActiveRunner™ server 116 and checks to see if there are any task requests in the queue. This is depicted as act 120. The 12:03 PM task request is in the queue and received by the ActiveRunner™ agent.

The ActiveRunner™ agent on the local system 126 processes the task request on the local system 126 at act 130. For instance, the task request might have been to retrieve a contract (a Word file) that the user was working on for a client. The Word file is returned to the ActiveRunner™ agent, which in turn transfers (or "posts") the file to the ActiveRunner™ server 116 at act 124.

The ActiveRunner™ server 116 stores the file and associates the file with the original task request. This association can be achieved by setting a notification status flag and indicating a location on the ActiveRunner™ server 116 where the file is located.

At act 112, the remote client 104 again polls the ActiveRunner™ server 116 to see if the task request is completed. The poll causes the ActiveRunner™ server 116 to retrieve the Word file stored in the ActiveRunner™ server 116, so that the file is downloadable by the remote client 104.

We note that, in a presently preferred embodiment, the ActiveRunner™ agent 126 is in charge—the agent 126 decides when and how to connect to the server 116 and process any task requests. Thus, the agent 126 can be operated independently of the server 116, for control purposes.

Communication Protocol for Remote File Access

Returning to FIG. 1, we now describe an inventive asynchronous remote file access protocol 6 that is our preferred embodiment of such a protocol used by the system 4. We describe this protocol 6 with reference to the system architecture 4, so we show dashed lines from the major components that indicate a start or stop point for communication. We note that we do not show start or stop points with respect to the speech module 50, but this is only for simplicity. The speech module 50 is an off-the-shelf component that is integrated into our system 4 primarily for data translation purposes between the server 10 and the client 20 for situations where a remote user does not have access to a digital assistant, laptop computer, or another desktop computing device—rather, the user has primary access to a telephone 25.

Beginning with signal C1, the remote client 20 sends a task request signal to the server 10. The task request signal C1 is received by the server 10 and is then queued in the task queue 14. The local agent 40, as part of its periodic poll of server 10, polls the server 10 with signal A1. The signal A1 is received by the server 10, which then checks its task queue 14 for any task requests. The task request from signal C1 is located, so the server 10 sends or forwards the task request to the local agent 40 at signal S1.

The signal S1 is received by the local agent 40 and processed. For instance, the local agent 40 generates a command to retrieve a local file 48 from the computer 44, and the local file 48 is returned or identified to the local agent 40.

At signal A2, the local agent 40 returns the task output/file to the server 10 with signal A2. The server 10 receives the signal A2 and sets a status notification flag in the task queue 14 indicating that the requested task, from signal C1, is complete, together with a link to the file, which is now stored on the server 10.

The server 10 can then generate a notification signal S2 to the remote client 20. We note that the server 10 can make a decision as to how the remote client 20 is to receive the notification of the task complete signal. It can be a "push" type of task complete signal (e.g. using telephone 25), or a "pull" type of task complete signal, depending on the preferences of the user at the remote client 20.

According to one embodiment, when the notification signal S2 is received by the remote client 20, it is processed by returning an instruction signal C2 back to the server 10. The instruction signal C2 indicates to the server 10 how the task output is to be returned to the remote client 20. For instance, a file might be instructed to be directly sent, or it might be instructed to be read, through the speech module 50, to another person at particular telephone number at some location other than the user's location.

When the instruction signal C2 is received by the server 10, it is processed accordingly, and the task output, here we refer to it as a "transfer", is returned to the remote client 20 (which can again be a remote client other than the remote client 20 that initiated the original task request signal C1) as file transfer signal S3.

An advantage of our communication protocol 6 is that it is asynchronous, meaning that a persistent connection between the various parts of our system, or even any two parts of our system, does not need to be persistently maintained—the only exception might be where a circuit switched call is the carrier between the remote client 20 and the speech module 50.

We note two other issues that we have considered. The first is security and the second is data or file synchronization.

As for the latter, file synchronization can be achieved with a lock management system implemented on the server 10. Such systems are generally known in the art and some typical techniques of lock management are disclosed by Jim Gray and Andreas Reuter in their book Transaction Processing: Concepts and Techniques, Morgan Kaufmann Publishers, San Francisco, 1993, ISBN 1-55860-190-2, pages 406-429, which are incorporated herein by reference. As for how this fits into our protocol 6, if an intent mode locking scheme is employed (that is, where lock modes specified according to the scope of use by the remote agent—such as read or write) then the intended lock mode can be passed with signal C1. This lock mode can then be sent to the local computer 44, which can maintain the lock modes so that the same file is not requested again by either the local computer 44 or the remote client 20, until the lock is released by synchronization of the file from the remote client 20.

Thus, after we receive the file and make our corrections on the remote client 20, we can then return the file in the same manner as we made the initial checkout, following signals C1 and A1. At signal S1, the updated file would be downloaded by the local agent 40, where it would be updated into computer 44 in files 48. The computer 44 would release the lock and send a signal back to the server 10 that the lock is released, in which case a notification signal can be returned to the remote client 20. According to one embodiment, a tiered lock management system can be employed, wherein the server 10 maintains a replication of the lock modes in its database 16, based on the lock management information in the local computer 44.

Turning briefly to the former, security issues, where a firewall is employed with the files 48 on the local computer, it envisioned that the local agent 40 will be placed behind the firewall. Where there is concern over an interloper receiving communications to the remote client 20, a simple bit-wise barrel shifting, or more sophisticated encryption schemes, such as public key/private key pairs, can be employed to maintain the security of the file or information transfers. Another option is to store files in a secured region of memory on the server 10 using the Windows 2000™ file system.

Agent Software Architecture

Figure 3:
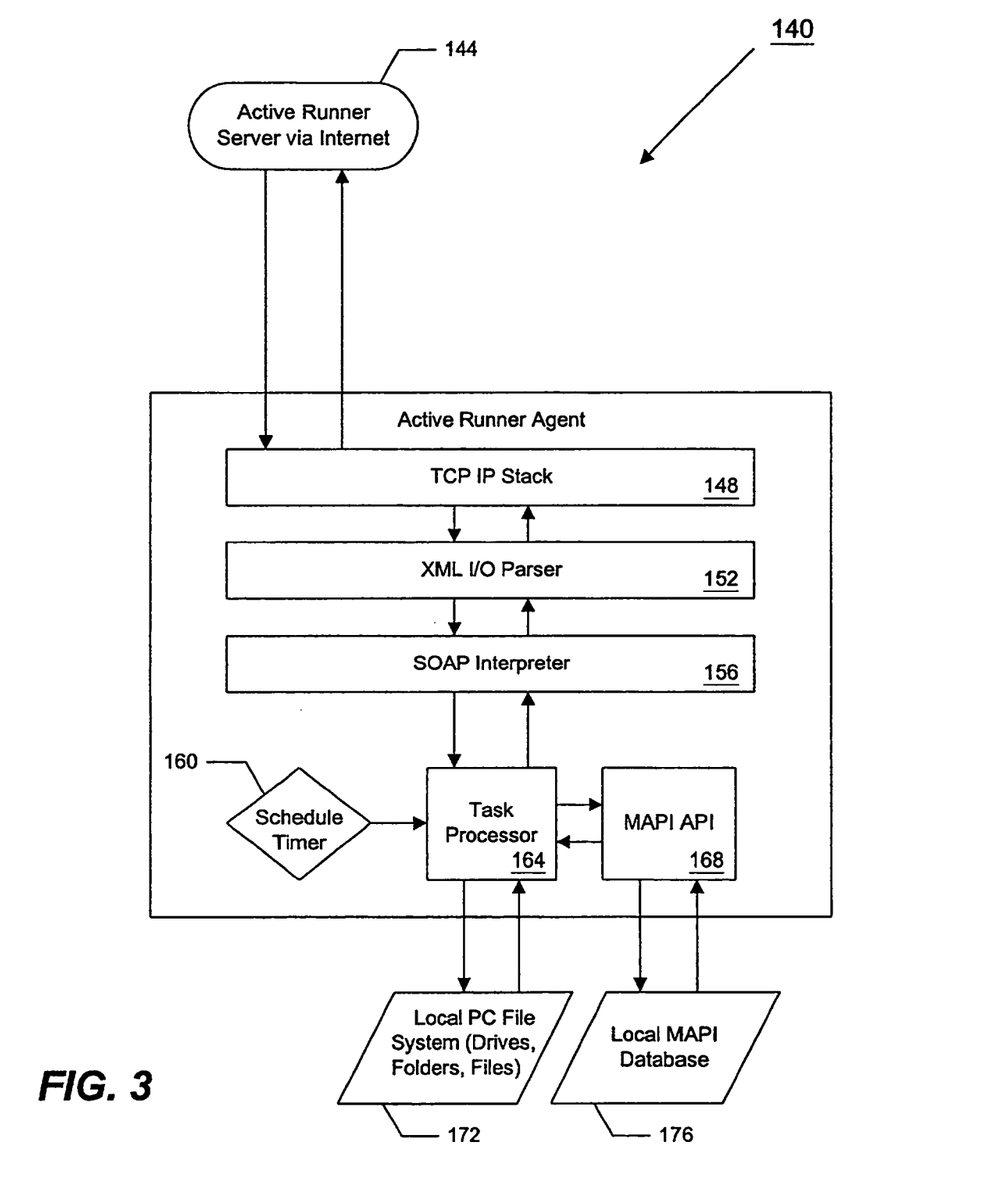
FIG. 3 shows an exemplary software stack associated with a local agent.

FIG. 3 depicts an exemplary software architecture 140 for the local agent 40. Shown connected to the agent software 140 is the ActiveRunner™ server 144, which is connected via the Internet. Also shown connected, and on which the ActiveRunner™ agent software 140 typically resides, is a local personal computer file system 172, and a local message application programming interface (MAPI) database 176, from which files such as e-mails, a calendar, or other information can be retrieved.

The software stack depicted in FIG. 3 is shown in the order in which we have implemented our software architecture, although other variations of this software stack could be implemented. We note that the drawing depicts each module in our software stack 140 having two directional arrows between another software module, this is to illustrate the manner in which data flow typically passes through each module as it flows through the software stack 140. Furthermore, we note that software stack 140 is a logical arrangement and that installation of the local agent 40 on a computer 44 can involve integrating the portions of the stack from the computer 44, rather than being separately installed modules—in short: we use the resources available on the host computer to the extent possible, where it is not possible, we install the resources as shown in the stack 140.

First, communication with the ActiveRunner™ server 144 is achieved with a TCP/IP (transmission control protocol/internet protocol) stack. From this module of the software stack, messages are parsed with an XML I/O parser 152 into message components. From there, a SOAP interpreter 156 handles the parsed messages and forwards them for actual processing to a task processor 164. For instance, the SOAP interpreter 156 interprets messages to or from the task processor 164 for executing in the local computer subsystem, operating system, or basic input output system. (Typically, the task request from the ActiveRunner™ server 144 is a SOAP structured request—so the other layers are primarily for handling the carrier and packaging means for this SOAP request.)

The task processor 164 can send or retrieve files from a local PC file system 172, or provide functional calls into the hooks of a MAPI application programmer interface 168, which is used to get into data and files stored in a local MAPI database 176.

A schedule timer 160 is also shown. This timer is primarily for instructing the task processor 164 to logon to the ActiveRunner™ server 144 and check for task requests from the remote client 20 (FIG. 1), or to upload files or information that may not have been transferred immediately when the local agent 40 (FIG. 1) received the task request from the server 144.

Following the data flow back up through the various computer program modules of the software stack 140: an electronic message is retrieved from the local MAPI database 176 through the MAPI API 168. This was returned in reply to an inbound task request (at the local agent).

The task processor 164 prepares the electronic message into a SOAP/XML format and posts the file back to the ActiveRunner™ server 144, using the SOAP interpreter 156, then the XML I/O parser 152, and then the TCP/IP stack 148, where the file is finally uploaded to the ActiveRunner™ server 144 over the Internet.

According to one embodiment, we have found that the Microsoft C++ 6, and C# development kits are ideal for development of our various modules. As well, the Microsoft .NET Mobile Software Development Kit works well for developing web-based interfaces for the system parts.

Agent Methods

Figure 4:
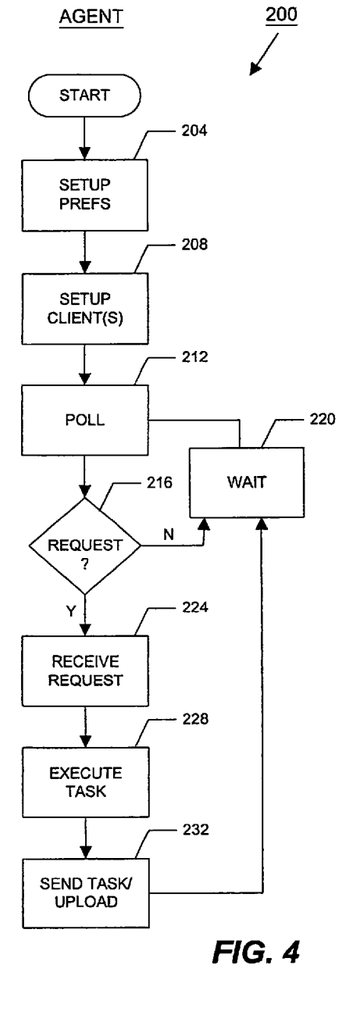
FIG. 4 is a flowchart for local agent software.

Next, we turn to FIG. 4, which is a flowchart of an embodiment of the local agent software 200, as implemented in the software stack 140 depicted in FIG. 3.

We begin with act 204, where general preferences for the local agent software are setup. For instance, the software receives preference setup information from a user concerning the agent polling schedule of the server 10, access numbers (or IP addresses), and other information concerning establishing a connection with the server 10. Furthermore, the preferences may include file type information, whereby the user tells the local agent software security information, or remote access privileges—for instance, the agent software 200 can receive a list of hard drives and folders where security is limited or restricted to the local computer 44 from remote clients 20, as well as public keys and private keys if encryption is employed.

In act 208, remote clients 20 can be setup. This can be done manually, by configuring the remote client in the agent software 200, or it can be done automatically. What is meant here is that remote clients 20 can be setup and managed, thereby giving a user of the local agent software 200 the ability to individually tailor access, security, or file transfer type information for particular remote clients, or globally setting such preferences, with respect to a the local computer the local agent is associated with.

In act 212, the local agent 40 polls the server 10. This is done by logging on to the server 10, typically using a user name and password pair via a modem or a LAN connection. At act 216, a test is performed to determine whether a non-fulfilled task request exists in the task queue 14 of the server 10. If a task request does not exist, then a wait state is entered in act 220, where the local agent 40 will logoff the server 10 and then reconnect to the server 10 once the next predetermined polling period (setup in act 204) has expired. However, if a non-fulfilled task request exists in the task queue 14, then processing by the local agent software 200 continues to act 224.

In act 224, the task request is received, sent or downloaded from the server 10 to the local agent 40. In act 228, the task request is parsed and executed, which typically involves retrieval of a file from the local computer 44, on which the local agent software 200 is typically resident. And at act 232, the task output is sent or uploaded to the server 10. We note again that this act can be performed while still logged on to the server 10, or it can be performed after the next polling period has elapsed—either way, the agent software 200 returns to act 220 to wait for the next poll period to elapse.

Client Methods

Figure 5:
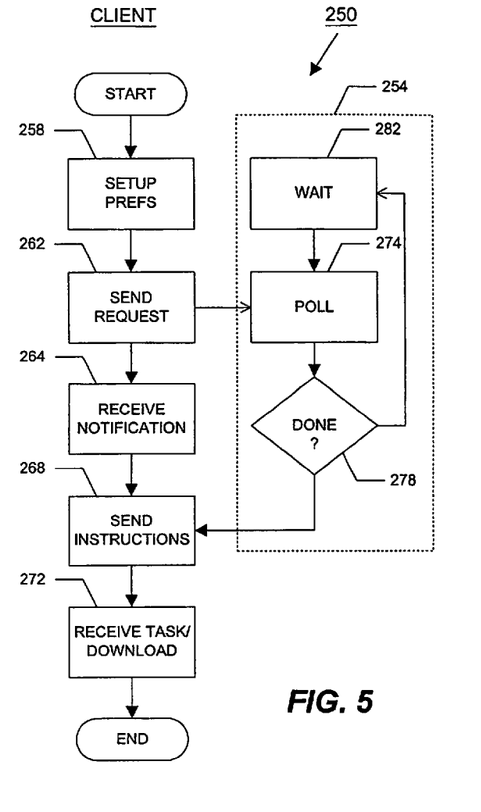
FIG. 5 is a flowchart for remote client software.

FIG. 5 is a flowchart for remote client software 250. The remote client software 250 can be actively executed on the remote client 20, or it can be an interface driven software, using XML or HTML on the remote client (thus requiring some user interaction to move to the next act)—hence the asynchronous nature of the communication protocol 6.

In act 258, preferences for the remote client are setup. This can involve establishing a return IP address, e-mail address, pager number, or telephone number to which task output from the local agent 40 can be returned by the server 10. It can also involve establishing acceptable file types (e.g. text, HTML, XML, RTF, Word™, voice, etc.), or rules for processing different file types (e.g., file size, file time, parsing instructions, special segmented delivery instructions, etc.), or rules for processing routing information if an error occurs. The setup preferences can also include rules for processing particular task requests that are uploaded to the server 10, these rules can be used for determining whether to proceed to acts 264 or 274 (after act 262), which are described below.

In act 262, the remote client 20 sends a task request to the server 10. This task request is typically created as a result of the remote client 40 receiving an input from a user—usually a specific request such as "get the e-mail message from Jane Doe, sent Feb. 1, 2001 from my home computer", entered through a web interface by a remote client.

Once the task request is sent to the server 10, the remote client 20 will wait for a reply from the server 10. According to one embodiment, the remote client 20 logs off of the server 10 and the polls the server 10 periodically to determine whether the task request was completed by the local agent 40. This process is depicted in optional/alternate act 254, depicted as individual acts 274, 278, and 282. However, according to another embodiment, remote client preferences, established with the local agent 40 or the remote client 20, indicate that the server 10 must notify the remote client 20 when the task request is complete. This method is depicted a act 264, where the remote client 20 receives a notification from the server 10 that the task request from act 262 is complete.

At act 268, having notification that that task request is complete, a rule associated with the remote client 20 is processed and instructions for delivery of the task output are returned by the remote client 20 to the server 10. In act 272, the remote client 20 receives the task output from the server 10, which usually involves downloading the requested file or information. From here, the process terminates.

Server Methods

Figure 6:
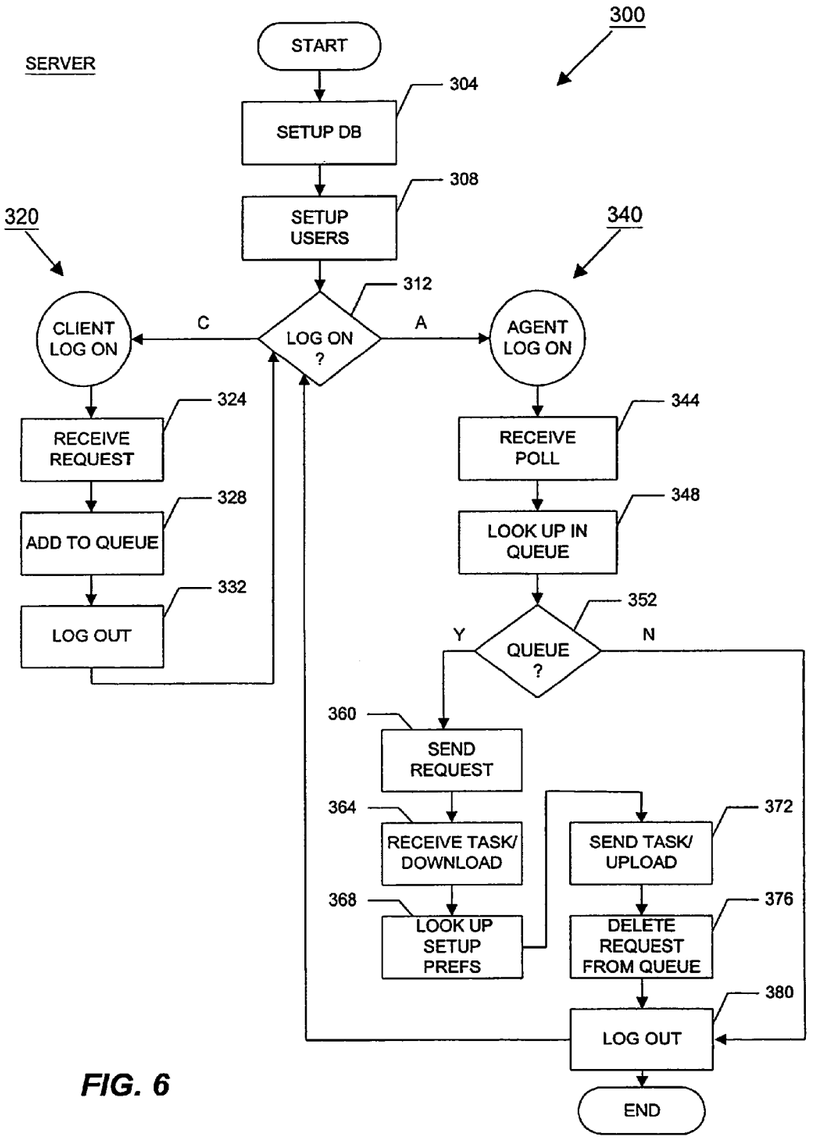
FIG. 6 is a flowchart for server software.
Figure 7:
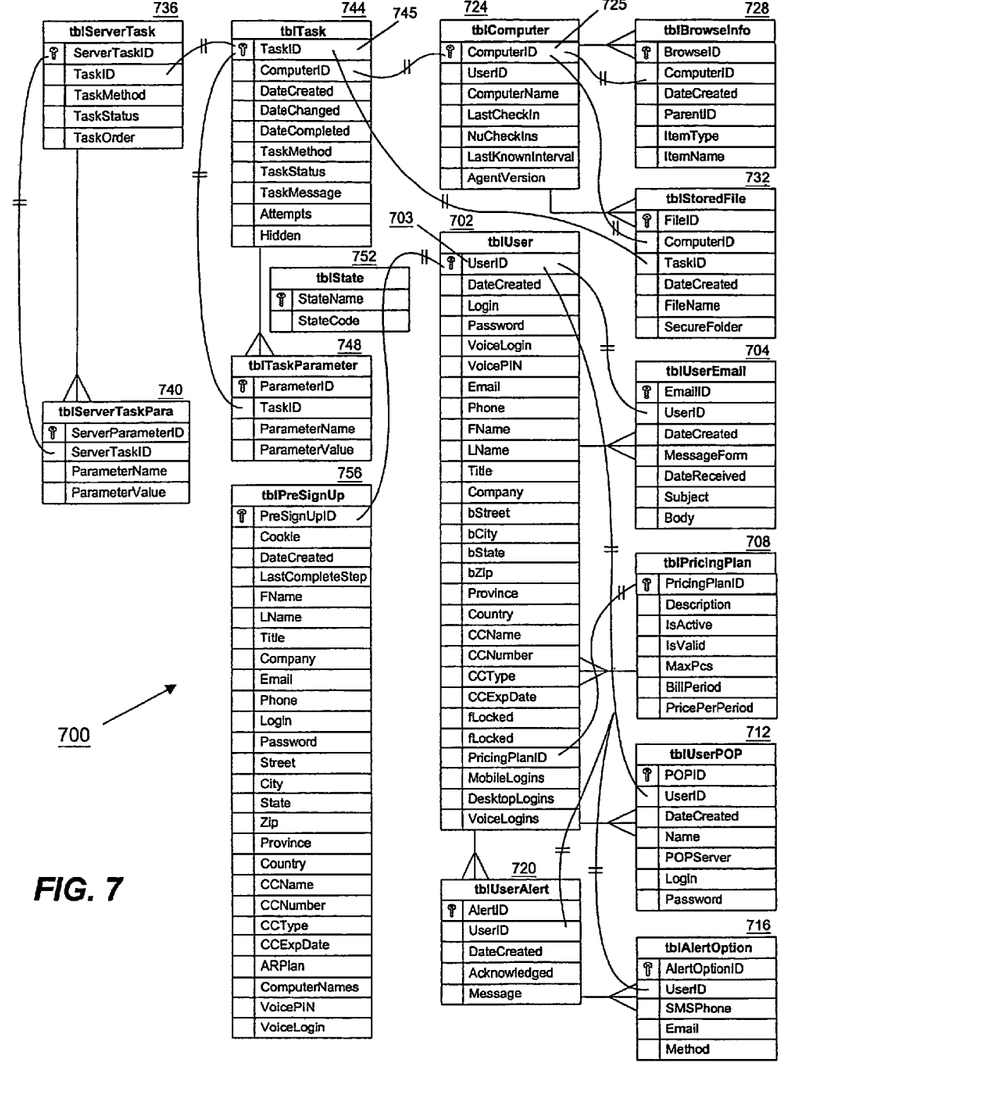
FIG. 7 depicts an exemplary database schema.

FIG. 6 is a flowchart for the server software 300. We begin with act 304, where the relational database management system 16 is setup. Here, we can setup remote client 20 and local agent 40 default values, such as polling period for the local agent 40, file types for different remote client 20 types, notification messages, upload file types, and other standard information concerned with the file management. Preferably, pricing plans and other user information is stored in the database 16, so it can be setup too. In act 308, users are setup for the database 16. This can be via manual entry, or an automated process that is part of a HTML or XML based web interface on the server 10. We note that an exemplary database schema for the database 16 is depicted in FIG. 7 and described below with reference that figure.

In act 312, a test is performed to determine whether a client 20 or agent 40 is attempting to logon to the server 10. If a client 20 is logging on, then the process continues to client processing module 320, otherwise, it continues to agent processing module 340.

In the client processing module 320, after the client 20 has logged on, then the task request is received in act 324. In act 328, the task request is added to the task queue 14. And in act 332, the client 20 is logged out. Processing can continue to act 312.

In the agent processing module 340, according to one embodiment, after the local agent 40 has logged on, then the server 10 first determines whether the logon is a standard poll of the server 10 to determine whether any tasks are waiting in the task queue 14, or if the logon is a file upload. According to one embodiment, the two states are treated independently of each other—meaning if you have one state, then you do not have the other. In another embodiment, the server 10 first receives and processes the file uploaded by the agent 40, and then checks the task queue 14 for any new tasks that need attention.

According to another embodiment, in act 344, the poll is received. Task requests in a task list corresponding to the local agent 20, are queried or looked up in the task queue 14 in act 348. In act 352, a test is performed to determine whether there are any outstanding tasks in the task queue 14. If there are no outstanding task requests in the task queue 14, then the local agent 40 is informed of such and logged out (act 380). However, if there are task requests in the task queue 14, then processing continues to act 360.

In act 360, the task request is sent (using SOAP or XML syntax) to the local agent 40. In act 364, the completed task is received from the local agent 40, typically this occurs by a file download to the server 10 from the local agent 40. In act 368, the server 10 can lookup any user preferences or special instructions to the server 10 that came with the task request and decide how to notify the remote client 20 that the task is complete. In some instances, a notification will be sent and instructions received, but in other instances no notification is sent, or the instruction is setup with the initial task request.

According to one embodiment, if a notification concerning the task being complete is sent to the remote client 20, then an instruction is received from the remote client 20 thereafter indicating to the server 10 how and where to send the task output/file.

In act 372, the task output is uploaded to the remote client 20, and in act 376, the original task request, corresponding to the uploaded task output, is deleted from the task queue 14. In act 380, which can take place anywhere after act 364, the local agent 40 is logged out of the server 10.

Database Architecture

Turning to FIG. 7, it is a database systems schema 700 we have developed according to an embodiment. The database 14, which implements the schema 700, as is mentioned above, can be implemented in SQL Server 2000™, which is available from Microsoft Corporation. The objective of the database 16 is to provide a central repository for information concerning local agents 40 and remote clients 20, as well as tasks and notifications, and the relationship of all of these entities to each other. Of particular advantage in our schema 700 is the use special purpose tables as a server side cache means for storing temporary data on the server 10 that is uploaded and in a transition state between the local agent 40 (more particularly a local computer 44) and the remote client 20.

Primary keys for each table are indicated with a key icon to the left of the primary key field. Keyed lines (with triangle-like shapes at one end) between the tables show the relationship between records—e.g. one-to-many. Other lines (with parallel slashes) between particular fields in the table point out the joins between the respective fields in the tables. According to one embodiment, not all of the joins shown, in particular as is shown in the task and cache tables (described below), need to be maintained in the database system. The names of the fields are self-explanatory and can obviously change between instances of the database 16 or database schema 700.

We note that three identifying properties are exhibited in the tables: First, a userid field 703 is the primarily link for a centralized set of tables, and indeed most all of the tables in the database 16. Second, a computerID field 725 is used for identifying local agents 40 and local computers 44 (which are roughly equivalent, as the local agent 40 resides on a local computer 44). Third, a taskID field 745 is the primary link between the task tables. Since the userid field 703 is linked to the computerID field 725, and the computerID field 725 to the taskID field 745, we are able to tie the local agent 40 to tasks, and the remote client 20 to tasks—and we do this in the database 16 on the server 10.

According to one embodiment, the task tables can include a remote clientID to identify a remote client (that can tie back to a particular userid 703) to the task. But for security purposes, the taskID field 745 itself can be used to identify the userid, or remote clientID, or computerID, such as by appending values to one of the previously mentioned values to make the taskID (and thus joining the tables through the prefix of the identifier).

Turning now to a detailed description of the schema: table 702 is a user table, in it is stored information concerning particular users of the system 4. Typical user information is stored in this table, such as contact information and billing information. A pricing plan table 708 holds pricing information related to the various pricing plans available. Invoice and payment tracking tables can also be included in the schema 700. Also included are normalization or pull-down tables, which make data entry through an interface (such as web interface on the server 10) consistent and user-friendly. Such a table is table 752, which speeds entry of a state. Other normalization tables can also exist. We also note the existence of a pre-signup table 756. This table is for temporarily storing user information for the user table 702 prior to completing the signup task.

A set of notification tables, 716 and 720, exist to assist the server 10 in completing the remote file access protocol—namely sending the notification signal to the remote client 20 when a task is completed. These tables are joined to the user table 702 through the userid field 703. Table 716 is for storing general contact information for the alert, while table 720 is for storing specific alerts responsive to completed tasks. We note that the alerts can be specified or tied to tasks, for instance with the addition of a taskID field 745 in the notification tables (in which case they might not be joined to the user table 702)

A set of task tables, 744, 748, 736, and 740, essentially make up the task queue 14—although the task queue 14 can be a subset of the information stored in these task tables. The task queue 14 can be a separate memory area that can be consistent addressed by the local agent 40 and the remote client 20 to retrieve task information, the data in the task queue 14 being continually updated from the task tables in the database 16.

Task requests from the remote client 20 are uploaded into the task request table 744. Parameters for each task are stored in one or more records in the task parameters tables 748, which is joined to the task request table 744 through the taskID field 745. A server task table 736 stores tasks that the server 10 needs to perform, which can be imparted based on the task request table 744 (there being a one-to-many relationship between table 744 and 736, respectively). As was the case with the task request table 744, a server task parameter table 740 exists to store parameters for the server tasks in the server task table 736.

Another set of tables, 712 and 704 corresponds to retrieving e-mail from the local computer 40. In particular, table 712 stores user information for retrieving the e-mail, while table 704 is a server side cache for temporarily storing e-mail that is retrieved/downloaded by the server 10. These tables are linked back to the user table 702 through the userid field 703. According to one embodiment, an attachment table (not shown) can be joined to table 704, the attachment table being configured to identify and store files attached to e-mail.

Still another set of tables, 724, 728, and 732 includes local agent 40 information for each of the local agents associated with a particular user. In particular, table 724 is primary agent table that corresponds to the local agent 40 installed on a particular local computer 44. There will typically be one agent per computer. Tables 728 and 732, like table 704, are server side cache tables, for temporarily storing browse information corresponding to the file system/directory and file structure in the local computer 44 (in table 728) and files 48' (in table 732). Their primary relation is via computerID field 725.

An example of browsing is appropriate, as it was first introduced above. Browsing is a standard task for our system 4 (while other standard tasks include e-mail retrieval and file transfer). A task request from the remote client 20 might be to retrieve a file 48, but the file name and location may not be known by the user. In this situation, the user will instruct the remote client 20 to sent a task request to the server 10 to browse the file system of the local computer 44. The task request will be stored in the task tables in database 16, so that it is accessible in the task queue 14. When the local agent 40 polls the server 10, it will find the browse task waiting in the task queue 14, and will retrieve from the local computer 44 file structure information. This information will be uploaded from the local agent 40 into the browse information table 728, so that the remote client 20 can navigate through the folder hierarchy (this information corresponds to the files 48).

The remote client 20 can then select a particular file from the information stored in the browse information table 728 and create a new task request to send to the server 10. The new task request will be stored in the task tables, and the local agent 40 will poll the server 10, recognizing the new task request in the task queue 14. The local agent 40 will the receive the task request from the from the server 10 and process the task. The particular file will, in turn, be uploaded to the server 10, where it will be stored in the stored file table 732.

Notification that the task is complete will be forwarded to the remote client 20, based on the information in the notification tables. The remote client 20 can return instructions to the server 10 on the particular delivery means desired for return of the task output/file. Once the task output/file has been transferred from the server 10 to the identified remote client 20, then the data in the server side cache tables can be deleted. According to one embodiment, this data is deleted immediately. However, according to another embodiment, data in these server side cache tables can "time-out", meaning that it will stay active and valid for a fixed expiration period. Employing a fixed expiration time can have the advantage of improving performance and response time, in that, statistically speaking, once a user of a remote client 20 has browsed the file system on the local computer 44, there is a high likelihood that the user will again browse the file system.

According to another embodiment, the schema can further included table for storing information related to file synchronization and remote client configuration and management, as well as for task and resource scheduling (beyond the data or information described above). For example, the schema can include tables for managing an interactive mode between the local agent and either the server and/or the remote client.

The systems and methods are described in relation to detailed figures of particular embodiments currently envisioned by the inventors. These figures and the accompanying detailed description are intended to be for illustration, and not necessarily for purposes of limiting the invention, except where expressly stated as such in the claims. Accordingly, alternative embodiments, in particular of the database schema 700, and physical or logical software structures, can be implemented without departing from the inventive concepts disclosed above.

Furthermore, the methods disclosed herein are intended as computer implemented methods, to be carried out on computer readable medium, such as a medium stored persistently in a computer, or stored and installed from a CD-ROM, or downloaded from the Internet. Thus, it is intended that the methods disclosed above and claimed below are embodied in a computer readable medium that includes thereon computer program code or a computer software product configured to cause one or more processors the carry out the methods or protocols set forth in the claims. Because the design can be modules, various means or programming modules can be included in the computer readable medium. As such, it is not strictly necessary, unless evident in the claims, that all of the means or modules are stored in a contiguous stream of bits, but can be broken up, stored, or taken from other programs associated with multiple microprocessors: what matters is that all the pieces are accessible so that the methods can be performed.

What is claimed is:

1. An article of manufacture comprising a non-transitory computer readable storage medium having program instructions stored thereon that, in response to execution by a local computer system, cause the local computer system to implement:

a task processor that, during operation, periodically polls a server for task requests originated by a remote computer system distinct from the local computer system, wherein in response to receiving one of said task requests specifying file directory information of the local computer system, the task processor causes the file directory information to be transferred to the server, and wherein in response to receiving a subsequent one of said task requests specifying a file stored on the local computer system and identified in the file directory information, the task processor causes the requested file to be transferred to the server; and, a transmission control protocol/Internet protocol stack coupled to the task processor that, during operation, enables communications between the local computer system and the server over a network.

2. The article of manufacture of claim 1, wherein the program instructions, in response to execution by the local computer system, cause the local computer system to further implement a communications module configured to provide a carrier for network communication to the server, wherein the local computer system is further configured to periodically poll the server through the communication module at intervals set by a schedule timer.

3. The article of manufacture of claim 2, wherein the task processor, during operation, is executable to configure the local computer system to access files in a computer memory.

4. The article of manufacture of claim 1, wherein the program instructions, in response to execution by the local computer system, cause the local computer system to further implement a message application programming interface communicatively coupled to the task processor, wherein, during operation, the message application programming interface is executable to provide the task processor access to a message application protocol interface database.

5. The article of manufacture of claim 4, wherein the message application protocol interface database provides access to e-mail and calendar information.

6. The article of manufacture of claim 1, wherein the task processor, during operation, is executable to transfer the requested file to the server by performing operations including:
retrieving the requested file from a local storage device coupled to the local computer system in response to the task request identifying the requested file;
sending the requested file to the server; and
instructing the server to notify the remote computer system that the requested file is available from the server.

7. The article of manufacture of claim 6, wherein instructing the server to notify the remote computer system that the requested file is available further comprises instructing the server that a notification include one of a push type of notification or a pull type of notification.

8. The article of manufacture of claim 6 wherein the task processor, during operation, is executable to process setup commands to individually tailor access, security, or file transfer type information for the remote computer system.

9. The article of manufacture of claim 6, wherein the task processor, during operation, is executable to periodically poll the server by performing operations including:
remotely logging onto the server using a LAN connection.

10. The article of manufacture of claim 1, wherein the file directory information comprises information that enables browsing of files in the local computer.

11. The article of manufacture of claim 1, wherein the program instructions, in response to execution by the local computer, cause the local computer system to further implement an extensible markup language parser coupled to the interpreter and to the Internet protocol stack, wherein the extensible markup language parser, during operation, is configured to parse communications between the transmission control protocol/Internet protocol stack and the interpreter.

12. An article of manufacture comprising a non-transitory computer readable storage medium having program instructions stored thereon that, in response to execution by a local computer, cause the local computer to implement:
a task processor that, during operation:
periodically polls a server for requests received by the server from a remote client device separate from the local computer;
receives one of said requests for directory information of the local computer;
retrieves the directory information, wherein the directory information identifies a file stored on the local computer;
sends the directory information to the server;
receives another of said requests for the file identified in the directory information;
retrieves the file; and
sends the file to the server; and
an interpreter coupled to the task processor that, during operation, interprets communications between the task processor and the server.

13. The article of manufacture of claim 12, wherein the task processor, during operation, is executable to transmit an instruction to the server to notify the user device that the file is available at the server, wherein the instruction further comprises a push type of notification or a pull type of notification.

14. The article of manufacture of claim 12 wherein the task processor, during operation, is executable to process setup commands to individually tailor access, security, or file transfer type information for the remote computer system.

15. The article of manufacture of claim 12, wherein the task processor, during operation, is executable to periodically poll the server by remotely logging onto the server using a LAN connection.

16. The article of manufacture of claim 12, wherein the directory information enables navigation of directories within the local computer.

17. The article of manufacture of claim 12, wherein the program instructions, in response to execution by the local computer system, cause the local computer to further implement an Internet protocol stack that, during operation, is configured to communicate with the server.

18. The article of manufacture of claim 17, wherein the program instructions, in response to execution by the local computer system, cause the local computer to further implement an extensible markup language parser coupled to the interpreter and to the Internet protocol stack, wherein the extensible markup language parser, during operation, is configured to parse communications between the Internet protocol stack and the interpreter.

19. An article of manufacture comprising a non-transitory computer readable storage medium having program instructions stored thereon that, in response to execution by a local computer, cause the local computer to implement:
a task processor that, during operation:
periodically polls a server for a task request received by the server from a remote computer that is distinct from the local computer, wherein the task request requests file structure information of at least a portion of the local computer, and wherein the requested file structure information identifies at least one file stored on the local computer; and
sends the requested file structure information to the server; and
a transmission control protocol/Internet protocol stack coupled to the task processor that, during operation, enables communications between the local computer and the server over a network.

20. The article of manufacture of claim 19, wherein the program instructions, in response to execution by the local computer, cause the local computer to further implement the task processor that, during operation:
- periodically polls the server for a subsequent task request received by the server from the remote computer, wherein the subsequent task request requests the at least one file stored on the local computer; and
- sends the at least one file to the server.

21. The article of manufacture of claim 19, wherein the file structure information at least in part enables inspection of a portion of a file structure residing on the local computer.

* * * * *